(12) United States Patent
Kaiser

(10) Patent No.: US 7,161,268 B2
(45) Date of Patent: Jan. 9, 2007

(54) HEAT SINK ARRANGEMENT, ELECTRIC MOTOR AND CASING PART

(75) Inventor: Bernhard M. Kaiser, Bonndorf (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 10/899,150

(22) Filed: Jul. 27, 2004

(65) Prior Publication Data

US 2005/0285460 A1 Dec. 29, 2005

(30) Foreign Application Priority Data

Jun. 23, 2004 (DE) .................. 20 2004 009866 U

(51) Int. Cl.
*H02K 1/32* (2006.01)

(52) U.S. Cl. ...................................... 310/64

(58) Field of Classification Search .................. 310/52, 310/58, 64, 89; 361/702, 709, 714; 257/707, 257/719; *H02K 9/22*
See application file for complete search history.

(56) References Cited

U.S. PATENT DOCUMENTS 4,840,222 A * 6/1989 Lakin et al. .................. 165/47
5,939,807 A * 8/1999 Patyk et al. .................. 310/89

* cited by examiner

*Primary Examiner*—Karl Tamai
*Assistant Examiner*—Nguyen N. Hanh
(74) *Attorney, Agent, or Firm*—Sughrue Mion, PLLC

(57) ABSTRACT

The invention relates to a heat sink arrangement with a heat sink with a cylindrical interior, in particular a casing of an electric motor or casing part for such, with power electronics integrated into the casing or casing part, with at least one electronics component pressed against the heat sink from inside, in which there is a spring ring, mounted in such a way that a contact pressure from the spring ring and the at least one electronics component is transmitted to the heat sink, and also an electric motor and a casing part for adding to an electric motor.

6 Claims, 1 Drawing Sheet

HEAT SINK ARRANGEMENT, ELECTRIC MOTOR AND CASING PART

BACKGROUND OF THE INVENTION

The invention is based on a priority application DE 202004009866.0 which is hereby incorporated by reference.

The invention relates to a heat sink arrangement with a heat sink with a circular-cylindrical interior, in particular a casing of an electric motor or casing part for such, with power electronics integrated into the casing or casing part, with at least one electronics component pressed against the heat sink from inside, an electric motor and a casing part.

Using FIG. 2, firstly the electronics part of a commercially available electric motor is described.

The casing of the electric motor is extended beyond the mechanical part of the motor in such a way that it also accommodates the electronics part with integrated power electronics. The casing therefore acts as heat sink 1 and can thus remove the dissipated heat from the power electronics. A slotted cooling ring 2 is clamped in this part of the casing by means of a spring element 3 inserted into the slot and expanding the cooling ring 2. The cooling ring 2 is cylindrical on its outside, in order to lie smoothly against the inside of the casing acting as heat sink. On its inside the cooling ring 2 has flat support faces; it additionally has threads. An electronics component 4 can be pressed on to each of these flat support faces by means of screws and flat springs 5, as part of the integrated power electronics.

In this initial example the entire power electronics is placed on a circular conductor plate and the electronics components to be cooled are mounted perpendicular in a circle. In this way the electronics components are connected, in a thermally excellent manner, to the entire motor casing, which therefore acts as a whole as heat sink.

There are also electric motors available in which the electromechanical and power electronics part are in separate casing parts flanged to one another.

However, this makes assembly of the electronics components on the inside of the cooling ring anything but easy.

SUMMARY OF THE INVENTION

The object of the invention is to cite an arrangement which is easier to assemble.

According to the invention, this object is achieved by a heat sink arrangement with a heat sink with a cylindrical interior, in particular a casing of an electric motor or casing part for such, with power electronics integrated into the casing or casing part, with at least one electronics component pressed against the heat sink from inside, wherein there is a lock washer, mounted in such a way that a contact pressure from the lock washer and the at least one electronics component is transmitted to the heat sink.

This object is further achieved by an electric motor with casing and power electronics integrated into the casing, characterised in that the casing is constructed as a heat sink arrangement.

This object is further achieved by a casing part for adding to an electric motor with integrated power electronics for this, characterised in that the casing part is constructed as a heat sink arrangement.

Therefore a commercially available lock washer is used to apply the required contact pressure.

Further configurations of the invention are found in the subordinate claims and the following description.

BRIEF DESCRIPTION OF THE DRAWINGS

The invention is further explained below with the aid of the attached drawings.

DETAILED DESCRIPTION OF THE INVENTION

Figure 1:
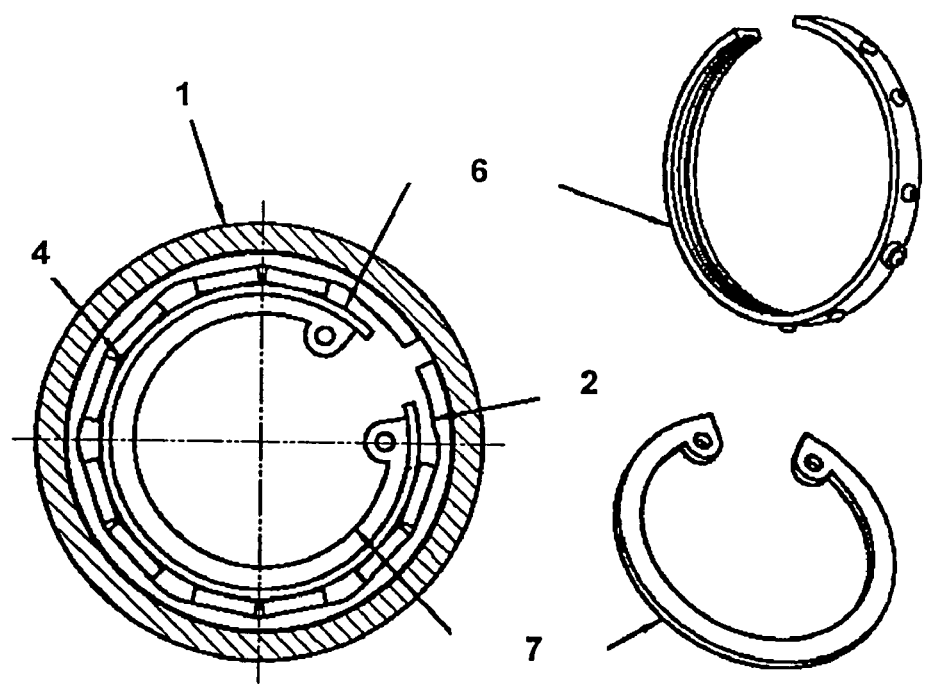
FIG. 1 shows the electronics part of a commercially available electric motor.
Figure 2:
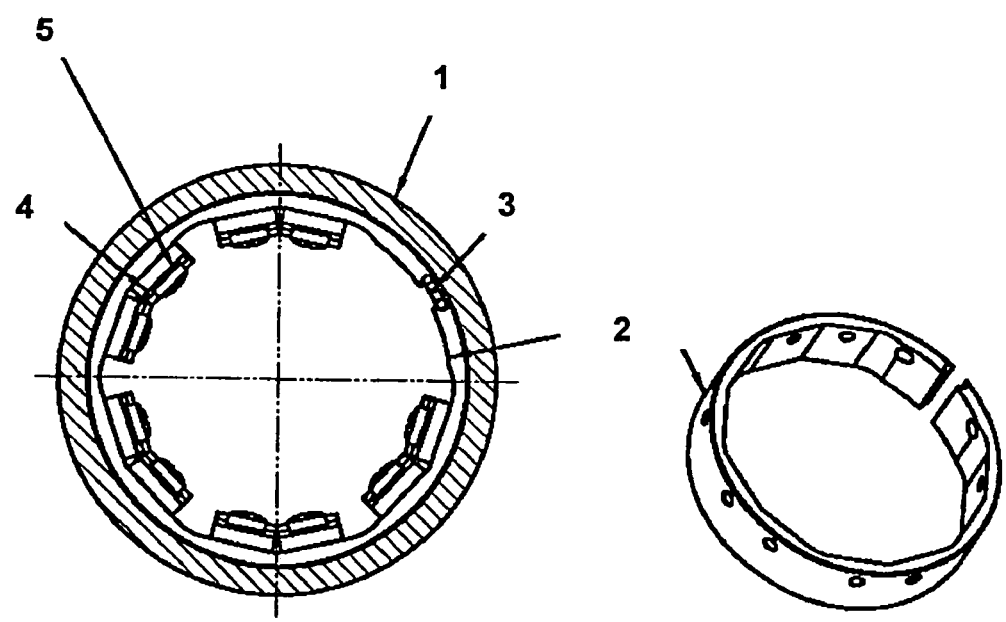
FIG. 2 shows a heat sink arrangement according to the invention.

FIG. 1 shows, apart from the already known heat sink 1, the cooling ring 2 and the electronics components 4, another clamping ring 6 and a lock washer 7.

The contact pressure applied by the lock washer 7 is in this case transmitted to the heat sink 1 via the clamping ring 6, the electronics components 4 and the cooling ring 2.

The contact pressure of the lock washer 7 is transmitted more evenly to the electronics components owing to the (slotted) clamping ring 6.

If the clamping ring 6, as illustrated here, has one knob per electronics component on its outside, it is possible on the one hand to adapt to electronics components of different thicknesses by means of knobs of different sizes. On the other hand, reliable thermal contact is guaranteed even if the electronics components do not have exactly plane-parallel surfaces.

The clamping ring 6 may have a circulating groove on its inside for better guiding of the lock washer 7.

The clamping ring 6 itself can be embodied as sprung and therefore take on the function of the lock washer. However, measures should then be taken to ensure that it can be tensioned during assembly and possibly also disassembly. However, this can also be done by a suitable tool.

As in the prior art mentioned, a slotted cooling ring 2 can be provided between the electronics components 4 and the heat sink 1. This can make assembly easier.

The cooling ring 2 can be further shaped in such a way that the heat sink 1 does not itself need to have flat support faces on its inside and yet good thermal contact is guaranteed even without heat-conducting paste.

Because of the arrangement of the flat faces on the inside of the cooling ring 2, it is also possible to take into consideration electronics components of different thicknesses.

A heat sink arrangement of this kind is firstly, as in the initially described prior art, to be seen as part of an electric motor. It can likewise be seen as a casing part for the separate power electronics of a motor of this kind.

The described heat sink arrangement can likewise also be used to obtain a compact arrangement and easy assembly of the heat sink for several electronics components in any other electronics circuits.

The external contour of the heat sink arrangement does not, of course, have to be circular. Electric motors of this kind, as also many heat sinks, otherwise often have a cross-sectional shape which is approximately square, in this case, however, having grooves which enlarge the surface for the purpose of cooling. But any other external contour which is suitable here and in particular can be easily achieved by continuous casting can be used.

The invention claimed is:

1. Heat sink arrangement with a heat sink with a cylindrical interior with power electronics integrated into the heat sink, with at least one electronics component pressed against the heat sink from inside, wherein there is a spring ring, mounted in such a way that a contact pressure from the spring ring and the at least one electronics component is transmitted to the heat sink,
characterised in that there is further a clamping ring, mounted in such a way that the contact pressure is transmitted from the spring ring to the at least one electronics component via the clamping ring, and
characterised in that the heat sink arrangement further includes a slotted cooling ring pressed against the heat sink arrangement from inside.

2. Heat sink arrangement according to claim 1, characterised in that the clamping ring has on its outside at least one knob, by which the contact pressure is transmitted to one of the at least one electronics components.

3. Heat sink arrangement according to claim 1, characterised in that the clamping ring has on its inside a circulating groove for accommodating the spring ring.

4. Heat sink arrangement according to claim 1, characterised in that the cooling ring is cylindrical on its outside and has at least one flat support face for an electronics component on its inside.

5. Electric motor with casing and power electronics integrated into the casing, characterised in that a casing of an electric motor is constructed as a heat sink arrangement according to claim 1.

6. Casing part for adding to an electric motor with integrated power electronics for this, characterised in that the casing part of the electric motor is constructed as a heat sink arrangement according to claim 1.

* * * * *